(12) United States Patent
Buerkle

(10) Patent No.: US 8,511,295 B2
(45) Date of Patent: Aug. 20, 2013

(54) MODULAR-HINGED GRILLING GRATE SYSTEM

(75) Inventor: Rolf Buerkle, Nierstein (DE)

(73) Assignee: Rolf Bürkle, Nierstein (DE)

( * ) Notice: Subject to any disclaimer, the term of this patent is extended or adjusted under 35 U.S.C. 154(b) by 261 days.

(21) Appl. No.: 13/086,080

(22) Filed: Apr. 13, 2011

(65) Prior Publication Data

US 2012/0260903 A1    Oct. 18, 2012

(51) Int. Cl.
*F23H 13/00* (2006.01)

(52) U.S. Cl.
USPC .............. 126/152 B; 126/152 R; 126/162; 126/163 A; 126/167; 126/169; 126/171; 126/172; 126/179; 126/540

(58) Field of Classification Search
USPC ............. 126/152 R, 162, 163 A, 167, 171, 126/172, 179, 540, 169; 220/538, 500, 575
See application file for complete search history.

(56) References Cited

U.S. PATENT DOCUMENTS

| | | | |
|---|---|---|---|
| 815,160 A * | 3/1906 | Gschwind | 126/171 |
| 1,462,393 A * | 7/1923 | Sturman | 126/176 R |
| 2,980,100 A | 4/1961 | Bamberger | |
| 2,986,138 A | 5/1961 | Moore | |
| 3,498,210 A | 3/1970 | O'Toole | |
| 3,814,076 A | 6/1974 | Zankowsky | |
| 3,815,571 A | 6/1974 | Heffelfinger | |
| 4,180,050 A | 12/1979 | Sizemore | |
| 4,432,334 A | 2/1984 | Holt | |
| D274,211 S * | 6/1984 | Haggard | D8/1 |
| 4,688,543 A | 8/1987 | Kopke | |
| 4,782,813 A | 11/1988 | Kopke | |
| 5,184,599 A | 2/1993 | Stuart | |
| 5,291,714 A * | 3/1994 | Wright et al. | 52/664 |
| 5,344,203 A * | 9/1994 | Tollenaere | 294/68.1 |
| 5,355,558 A | 10/1994 | Vertanen | |
| 5,458,054 A | 10/1995 | Yu | |
| 5,725,297 A * | 3/1998 | Crowder et al. | 362/84 |
| 6,425,487 B1 * | 7/2002 | Emmott et al. | 209/703 |
| 6,799,567 B1 | 10/2004 | Genest | |
| 7,303,669 B2 * | 12/2007 | Monneret | 210/164 |
| 7,669,523 B1 | 3/2010 | Zemel | |
| D620,312 S * | 7/2010 | Jendrass | D7/408 |
| 7,753,045 B1 * | 7/2010 | Weese | 126/9 R |
| 2005/0039611 A1 | 2/2005 | Nett | |
| 2005/0120890 A1 | 6/2005 | Hill | |
| 2005/0230295 A1 * | 10/2005 | Monneret | 210/164 |
| 2007/0006863 A1 | 1/2007 | Barbarich | |
| 2009/0020108 A1 | 1/2009 | Chiang | |
| 2009/0064872 A1 | 3/2009 | Zisserson | |
| 2009/0205626 A1 * | 8/2009 | Ferreiro Cerceda | 126/25 A |
| 2009/0211563 A1 | 8/2009 | Blackshear | |
| 2010/0006083 A1 | 1/2010 | Educate | |

FOREIGN PATENT DOCUMENTS

DE    20 2008 008 482    12/2008

* cited by examiner

*Primary Examiner* — Kenneth Rinehart
*Assistant Examiner* — Jorge Pereiro
(74) *Attorney, Agent, or Firm* — Shimo Kaji

(57) ABSTRACT

A modular-hinged grilling grate system may include a modular outer support structure and at least one attachable swivel grill grate section.

5 Claims, 3 Drawing Sheets

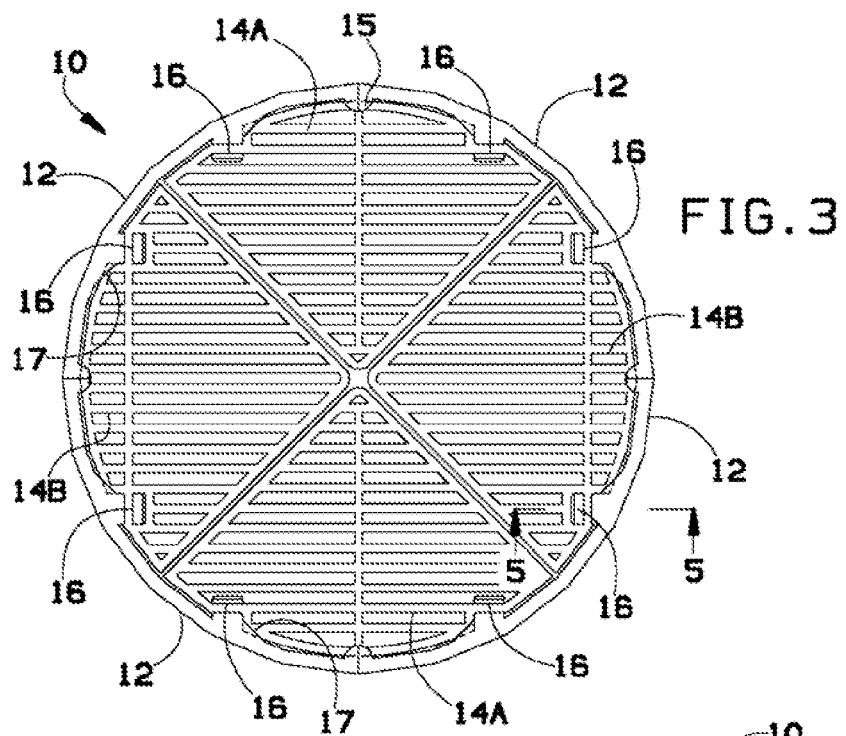
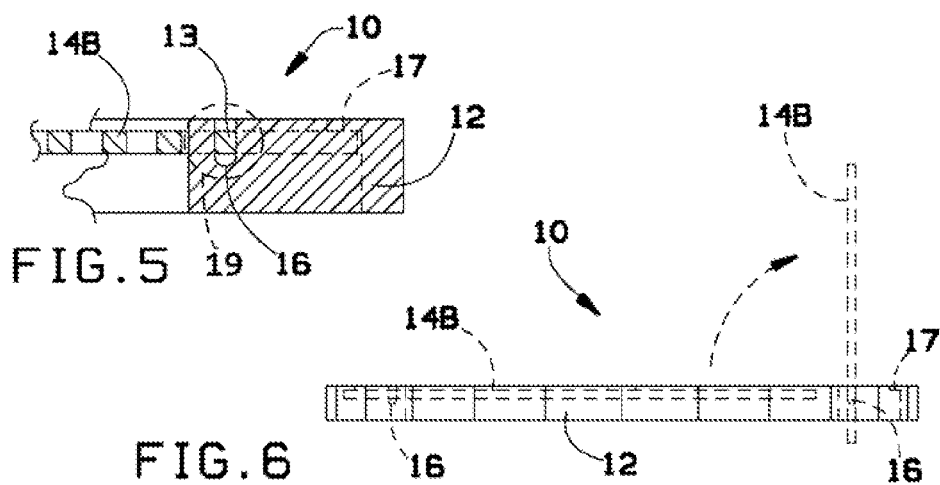

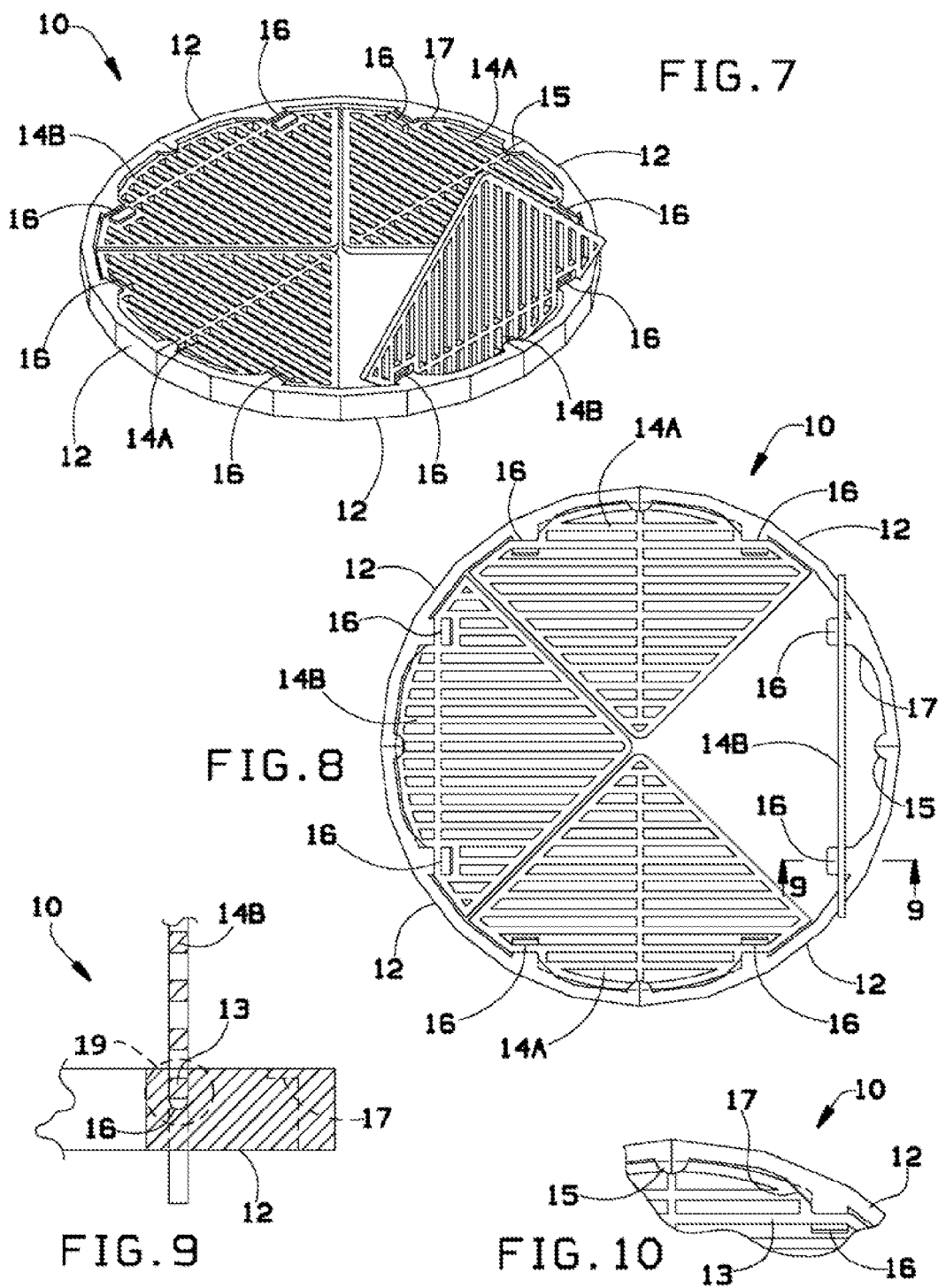

MODULAR-HINGED GRILLING GRATE SYSTEM

BACKGROUND OF THE INVENTION

The present invention relates in general to outdoor grills for outdoor cooking over charcoal fires, and more particularly to grill grating systems with modular-hinged grilling grates.

Presently a number of different types of outdoor cooking grills are available for cooking over fires of charcoal or similar fuel. Some of them have modular grilling grates. However, modular grilling grates have shortcomings when accessing a fire area beneath the grilling grates, to rearrange or to replenish the fuel. A center support structure obstructs the access and the hot and dirty grilling grates need to be placed somewhere.

As can be seen, there may be a need for a grill grating system, which provides easy access to the grilling fuel.

SUMMARY OF THE INVENTION

In one aspect the present invention a grilling grate system, comprising: a modular outer support structure; and at least one attachable swivel grill grate section, wherein the grate section is configured for disposition atop the modular outer support structure.

These and other features, aspects and advantages of the present invention may be become better understood with reference to the following drawings, description and claims.

BRIEF DESCRIPTION OF THE DRAWINGS

FIG. 3 is a top view of the grilling grate system of FIG. 1;

FIG. 4 is a side view of the grilling grate system of FIG. 1;

FIG. 5 is a detailed cross-section view of the grilling grate system along line 5-5 of FIG. 3;

FIG. 6 is a side view of the grilling grate system of FIG. 1 illustrating a grate section rotated upward in phantom;

FIG. 7 is a perspective view of the grilling grate system of FIG. 1 illustrating the grate section rotated upward;

FIG. 8 is a top view of the grilling grate system of FIG. 1 illustrating the grate section rotated upward;

FIG. 9 is a detailed cross-section view of the grilling grate system along line 9-9 of FIG. 8; and FIG. 10 is an enlarged partial view of the grilling grate system FIG. 1.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, an embodiment of the present invention generally provides a modular-hinged grilling grate system.

Figure 1:
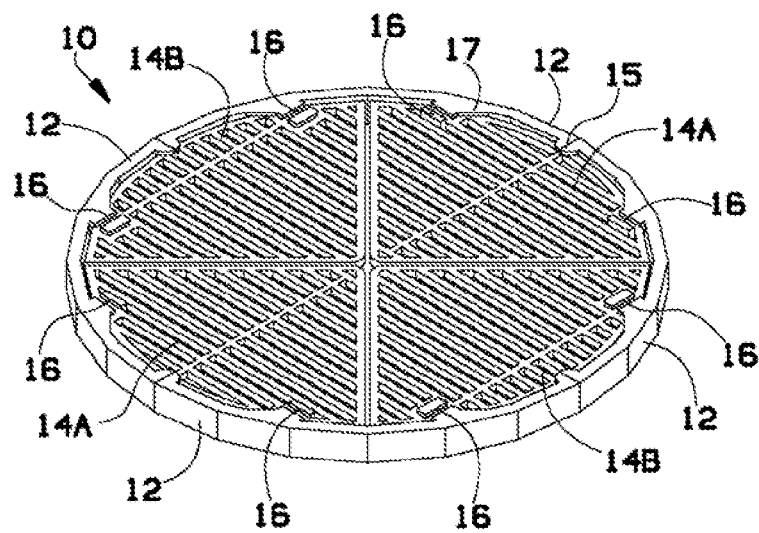
FIG. 1 is a perspective view of a grilling grate system according to an embodiment of the present invention.
Figure 2:
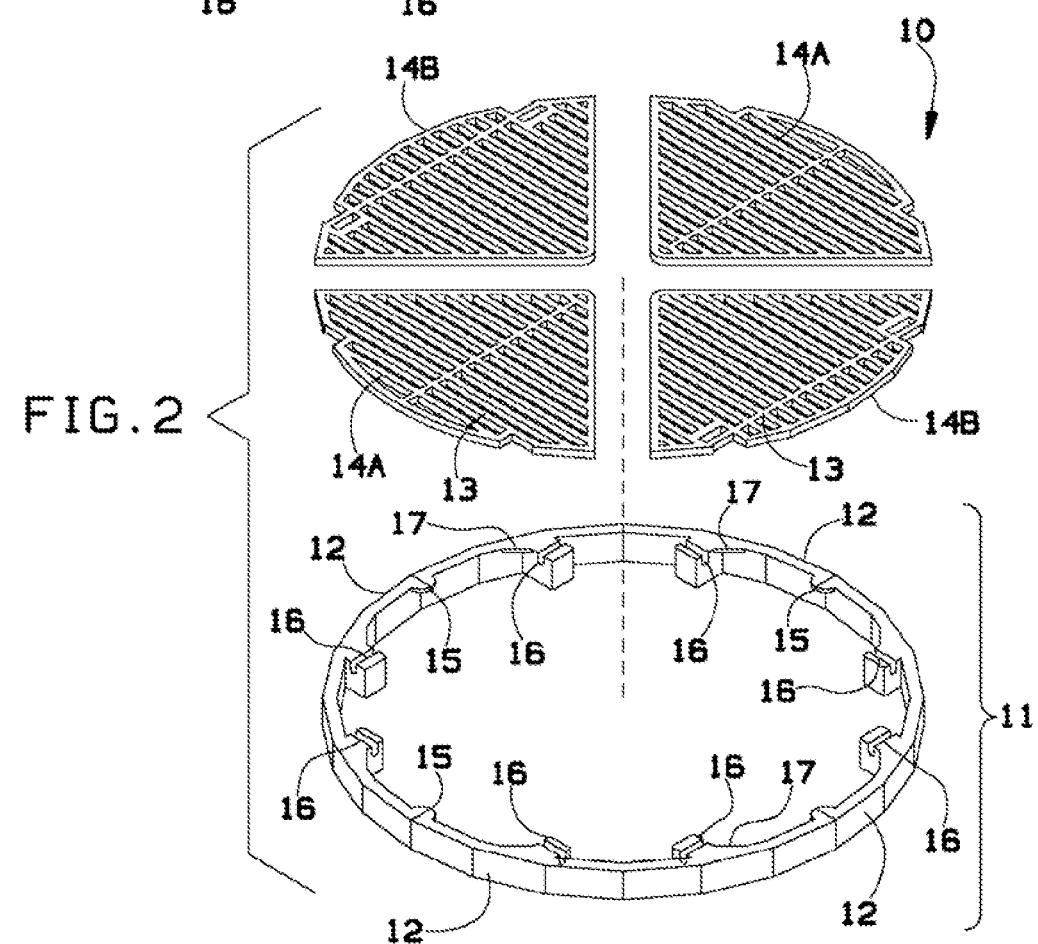
FIG. 2 is an exploded perspective view of the grilling grate system of FIG. 1.

Referring now to FIGS. 1-10, different views of the modular-hinged grilling grate system 10 are shown according to an exemplary embodiment of the present invention. The grilling grate system 10 may include a modular outer support structure 11 and a plurality attachable swivel grill grate sections 14A and/or 14B.

The outer support structure 11 may be assembled from one to four outer support modules 12 that may be attachable to each other. The outer support modules 12 may support one swivel grill grate section 14A or 14B. The outer support modules 12 may have a shape of a quarter-arc. A fully configured outer support structure 11 may form a circular ring. Each of the outer support modules 12 may include two grate insert sockets 16. The grate insert socket 16 may be configured to receive a portion of hinge bar 13 of the swivel grill grate section 14A or 14B and to provide rest support for the hinge bar 13. The grate insert socket 16 and the hinge bar 13 may form a hinge 19. The axis of rotation of the hinge may be parallel to a secant of the outer support modules 12. The hinge may allow the swivel grill grate section 14A and/or 14B to rotate from horizontal position to about 120 degrees upward, typically about 105 degrees upward. In one exemplary embodiment, a stop tab 15 may be formed at the center of the outer support module 12 to prevent the swivel grill grate section 14A or 14B from rotating below the horizontal plane. In another exemplary embodiment, a stop shoulder 17 may be formed as part of the grate insert socket 16 to prevent the swivel grill grate sections 14A or 14B from rotating below the horizontal plane. In yet another exemplary embodiment the outer support module 12 may have both the stop tab 15 and the stop shoulder 17.

The swivel grill grate sections 14A and 14B may be made from cast-iron or similar rigid material. The swivel grill grate sections 14A and 14B may have a shape of a quadrant. The swivel grill grate section 14A may be formed from a plurality of parallel bars disposed within a quarter arc, the bars may be parallel with the secant of the quadrant.

The swivel grill grate sections 14B and 14A may be functionally identical and structurally very similar. The swivel grill grate sections 14B and 14A may differ only in the orientation of parallel bars within the quarter arc. In the swivel grill grate sections 14B, the bars may be perpendicular to the secant of the quadrant. The hinge bars 13 may be formed parallel with the secant of the quadrant.

It should be understood, of course, that the foregoing relates to exemplary embodiments of the invention and that modifications may be made without departing from the spirit and scope of the invention as set forth in the following claims.

What is claimed is:

1. A grilling grate system, comprising:
   a modular outer support structure; and
   at least one attachable swivel grill grate section,
   wherein the grate section is configured for disposition atop the modular outer support structure,
   the support structure includes at least one outer support module,
   the outer support module includes two grate insert sockets, the grate insert sockets configured to receive the attachable swivel grill grate section,
   the attachable swivel grill grate section has a shape of a quadrant,
   the attachable swivel grill grate section includes a hinge bar being parallel with a secant of the quadrant, and
   the hinge bar configured to hingebly fit into the grate insert sockets.

2. The grilling grate system of claim 1, wherein the outer support module has a shape of a quarter-arc.

3. The grilling grate system of claim 1, wherein the outer support module includes a stop shoulder formed as part of the grate insert sockets to prevent the attachable swivel grill grate section from rotating below a horizontal plane, wherein the stop shoulder is configured towards a top surface of the other support module.

4. The grilling grate system of claim 1, wherein the attachable swivel grill grate section is formed from a plurality of parallel bars disposed within the quadrant.

5. The grilling grate system of claim 1, wherein the attachable swivel grill grate section is made of cast-iron material.

\* \* \* \* \*